Nov. 13, 1962 A. F. CARY 3,064,077

INDICIA TRANSFER SYSTEM

Filed Jan. 29, 1959 3 Sheets-Sheet 1

INVENTOR.
Albert F. Cary

BY S.C. Yuter

ATTORNEY

Nov. 13, 1962 A. F. CARY 3,064,077

INDICIA TRANSFER SYSTEM

Filed Jan. 29, 1959 3 Sheets-Sheet 2

*INVENTOR.*

Albert F. Cary

*BY*

ATTORNEY

Nov. 13, 1962 A. F. CARY 3,064,077

INDICIA TRANSFER SYSTEM

Filed Jan. 29, 1959

3 Sheets-Sheet 3

INVENTOR.

Albert F. Cary

BY

[signature]

ATTORNEY 3,064,077
INDICIA TRANSFER SYSTEM
Albert F. Cary, Merion Station, Pa., assignor, by mesne assignments, to Technitrol, Inc., Philadelphia, Pa., a corporation of Pennsylvania
Filed Jan. 29, 1959, Ser. No. 789,899
13 Claims. (Cl. 178—6.6)

This invention pertains to information transfer systems and more particularly to apparatus for transferring indicia between record media.

One of the more common systems for transferring indicia such as fixed images on a record medium is known as facsimile. Typical fixed images which can be transferred are photographs, maps, sketches, printed text and handwriting. In general, there are two separate operations associated with a facsimile system. The first operation is concerned with reading from a record medium; that is, converting the image on the record medium into a pattern of electrical signals which are transmitted to a remote position. The second operation is concerned with recording on a record medium; that is, converting a pattern of electrical signals received from a remote position to a fixed image on a record medium.

Both operations use a process called scanning. During the scanning process, elemental areas of a record medium are sequentially made available to a recording or reading element in a predetermined order so that after a period of time the entire record medium has been covered. Generally, the scanning process involves two directions of motion; one is transverse to the record medium and the other is longitudinal along the record medium. If the transverse movement is much faster than the longitudinal movement and periodically recurs, the scanning pattern is a plurality of substantially parallel lines starting at one edge of the record medium and ending at the opposite edge.

Thus, if a scanning member includes a reading means which is sensitive to a characteristic of the record medium such as intensity of light reflected or diffused therefrom, the fixed image can be read. Similarly, if a scanning member includes a recording means which can mark the record medium in response to the intensity of electrical signals, a fixed image can be recorded on the record medium.

Although it is desirable to have a single facsimile unit that can simultaneously read and record, or which can either read or record as desired, such units, called transceivers, are generally unsatisfactory. Transceivers are usually of the rotating drum type. A drum type facsimile machine supports the record medium on the surface of a rotating cylinder or drum while a reading or recording member moves axially along the surface of the drum or the drum translates along its own axis while it is rotating. Such a device limits the size of the record medium capable of scanning and cannot scan continuous record media. On the other hand, most continuous scanning type facsimile devices use such radically different scanning systems for reading and recording that separate mechanisms must be used.

It is accordingly an object of a general aspect of the invention to provide an improved facsimile transceiver.

It is another object of this aspect of the invention to provide an improved facsimile transceiver capable of operating with continuous record media of indefinite length.

It is a further object of this aspect of the invention to provide a facsimile transceiver wherein the scannings for recording and reading are accomplished in identical manners with a single, simple and inexpensive mechanism.

Briefly, in accordance with a general aspect of the invention, apparatus is provided for transferring information between record media. The apparatus includes a first scanning member for sensing or reading indicia and a second scanning member for recording indicia. A rotatable support means carries the first and second scanning members. Means are further provided for rotating the rotatable support member in substantially a plane. The scanning members are positioned on the same side of the plane. Means are provided for moving the record media having indicia to be sensed in a plane parallel to the plane of rotation. Means are further provided for moving the record medium upon which indicia are to be recorded in a plane parallel to the plane of rotation.

Although many reading methods have been proposed, it has been found that optical reading schemes are most desirable because of their versatility. Accordingly, many optical scanning means have been suggested. Unfortunately, these systems usually require complicated systems of optical elements which are very expensive. In continuous scanning devices, the complex optical systems further require very sensitive optical transducers such as photo-multiplier tubes. Often, the reliability of such systems is limited by a very small signal to noise ratio; that is, the amplitude of the signal is not much greater than the amplitude of the noise. There have been attempts to minimize the complexity of the optical systems by incorporating moving light sources and light sensitive elements in the system. However, this often leads to non-uniform distributions of light and requires commutating means which can further minimize the signal to noise ratios.

In other attempts to minimize the optical complexity various schemes have been proposed to orient the record medium with respect to the optical scanning means. Unfortunately these schemes usually require that the record medium be bent or distorted. Hence such schemes cannot be incorporated in facsimile apparatus which must scan planar record mediums.

Accordingly, it is an object of an important aspect of the invention to provide an improved optical scanning means for scanning planar record mediums.

It is another object of this aspect of the invention to provide an optical scanning means which has a simple and reliable optical system.

It is a further object of this aspect of the invention to provide an optical scanning means which has a uniform distribution of light and a large signal to noise ratio.

It is a still further object of this aspect of the invention to provide optical scanning means with an optical transducer which requires no electrical commutating means.

Briefly, in accordance with this aspect of the invention, apparatus is provided for sensing indicia from a record medium. The apparatus includes a source of light for illuminating the record medium and a light responsive means for sensing light from the record medium. Scanning means are operatively disposed with respect to the record medium for limiting the response of the light responsive means to light from scanned areas of the record medium. Means are provided for rotating the scanning means about an axis and means are further provided to move the record medium perpendicular to the axis.

It should be noted that with such apparatus it is possible to easily employ a plurality of scanning means with a simple source of light and a single light responsive means.

It should be noted that the scan paths of such a system will be arcuate and accordingly have advantages over straight scan paths. For example, most copy information is usually in an orthogonal pattern. Hence, successive straight scan paths can possibly skip over or miss thin copy lines, whereas arcuate scan paths will intersect and therefore transmit these thin lines.

Most facsimile systems require that the record medium be inserted into the apparatus. Hence these systems cannot transfer indicia to or from a record medium which is either fixed or too wide to be accepted by the system.

It is accordingly an object of another aspect of the invention to provide an indicia transfer apparatus which can transfer indicia to and from record mediums which must remain fixed.

It is another object of this aspect of the invention to provide apparatus for scanning indicia from a record medium having any dimensions.

According to this aspect of the invention, apparatus is provided for scanning a fixedly supported record medium with a scanning means. Means are provided for moving the scanning means across the record medium and means are further provided in contact with the record medium for moving the scanning means longitudinally along the record medium. In other words, a self-propelled facsimile apparatus is provided.

Various other aspects of the invention are concerned with optimizing the optical systems and providing for multiple scanning means.

These features, and further objects, features and advantages of the invention will be apparent from the following detailed description of the invention when read with the accompanying drawings wherein.

Figure 1:
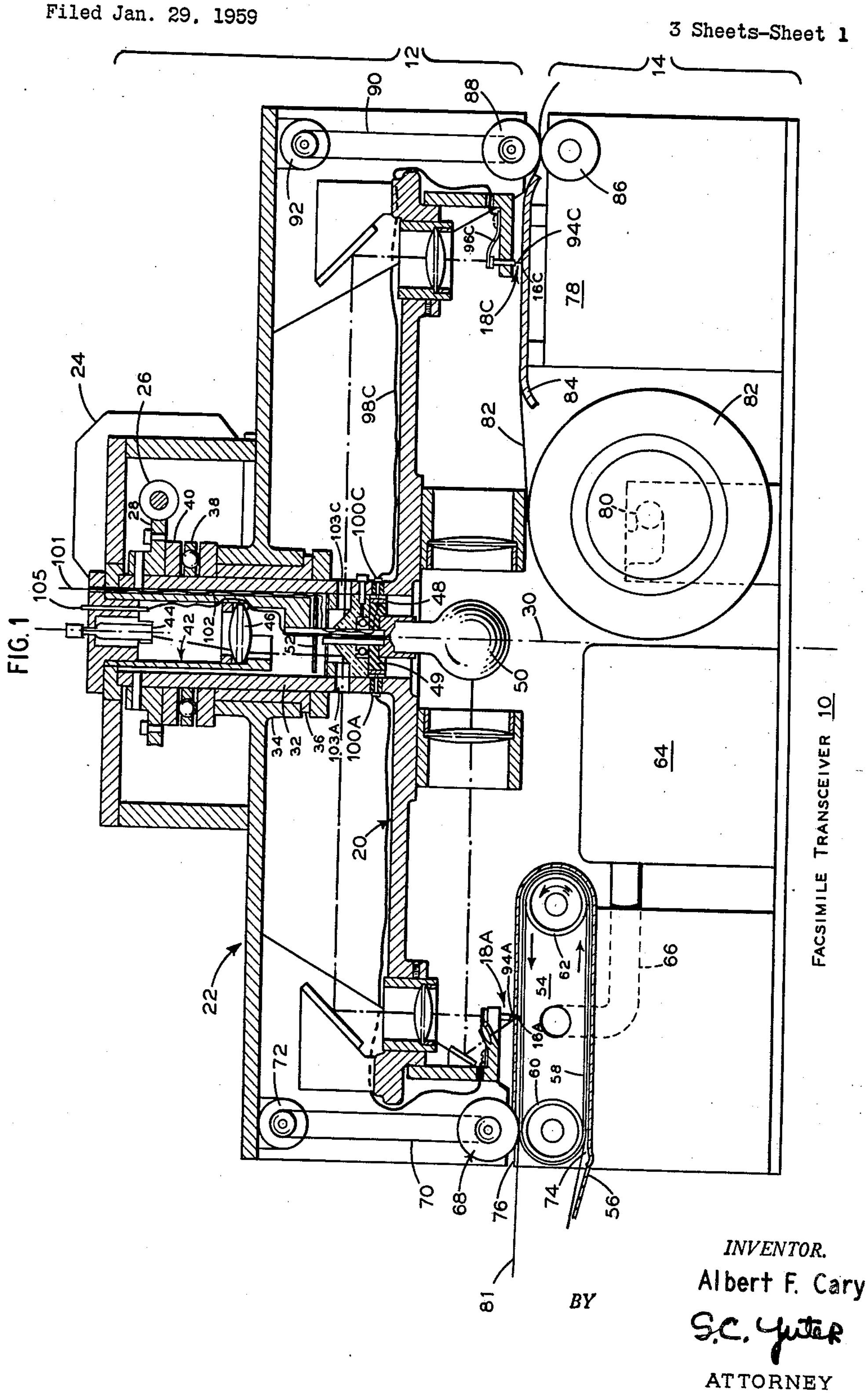
FIGURE 1 shows a sectional view of facsimile apparatus in accordance with a preferred embodiment of the invention.

Referring to FIGURE 1, a facsimile transceiver 10 is shown comprising two major sections, a scanning section 12 for scanning record media and a record media handling section 14. A plurality of reading scanning means **16*a* to 16*d* (of which only two are shown) and a plurality of recording scanning means 18*a* to 18*d* (only two of which are shown) are carried by a rotatable support means 20. Each reading scanning means 16*a* to 16*d* is diametrically disposed with respect to one of the recording scanning means 18*a* to 18*d*. In general, rotatable support means 20 is rotated in carriage 22 so that record media in record media handling section 14 are sequentially scanned by the reading scanning means 16*a* to 16*d* and/or by the recording scanning means 18*a* to 18*d*. Means including a motor 24 having a worm 26 fixed to its shaft which mesh a wheel 28 fixed to the rotatable support means 20 is provided for rotating the rotatable support means 20 about an axis 30. Thus, the reading scanning means 16*a* to 16*d* and the recording scanning means 18*a* to 18*d* are disposed on one side of a plane which is perpendicular to the axis 30**.

More particularly, a hollow shaft portion 32 of the rotatable support means 20 is disposed within a collar section 34 of carriage 22. Disposed between hollow shaft section 32 and collar portion 34 is an oilite bearing 36 to facilitate rotation. Thrust bearing means 38 are operatively interposed between a collar 40 fixed to hollow shaft section 32 and the top of collar portion 34 of the carriage 22. A simple and reliable means is accordingly provided to permit the rotation of rotatable support means 20 in carriage 22. A fixed support means 42 extends from carriage 22 to within hollow shaft section 32 to stationarily support a photoelectric cell 44 (light responsive means), a lens 46, a commutator segment support 49, a source of light 50, and a major light gate 52, hereinafter more fully described.

Record media handling section 14 provides means for moving record media to be scanned by the reading scanning means **16*a* to 16*d* and the recording scanning means 18*a* to 18*d* of scanning sections 12 in directions which are perpendicular to the axis 30**. Two record media moving means are provided to move record media in planes along their longitudinal direction.

A record media moving means 54 is provided for transporting the record media 81 bearing fixed images that are to be sensed via the reading scanning means 16. The record media moving means 54 includes a loading tray 56, a perforated belt 58 and a pair of idling rollers 60 and 62 for carrying the perforated belt 58. A suction box 64 is coupled via a duct 66 to the interior of perforated belt 58. A power roller 68 mounted on the carriage 22 and driven by a belt 70 coupled to a synchronous motor 72 having suitable reduction gears is in contact with perforated belt 58 to cause it to move in a counter-clockwise direction as shown in FIGURE 1. When a record medium 81 is fed into entrance slot 74, it is sucked against perforated belt 58 and carried past the reading scanning means **16*a* toward the exit slot 76. The record medium 81 is accordingly maintained flat and moves in a planar path parallel to the plane of rotation of the reading scanning means 16*a* to 16*d*. An arcuate scan is performed transversely across the record medium 81 as it moves in a longitudinal direction away from the axis 30. Suitable optical commutating means are hereinafter more fully described to insure the proper initiation and termination of the scan by the appropirate one of the reading scanning means 16*a* to 16*d***.

A second record moving means 78 is provided for moving the record medium upon which information is to be recorded by the recording scanning means **18*a* to 18*d*. The record handling means 78 includes a reel 80 for supporting a roll of paper 82 that is electro-sensitive which is positioned opposite the recording scanning means 18*c* by a platen 84. The paper 82 moves between an idler roller 86 and a power roller 88. The power roller 88 is energized via a belt 90 coupled to a synchronous motor 92 (having suitable reduction gears) associated with the scanning section 12. The power roller 88 is suitably mounted on the carriage 22 of the scanning section 12. Thus the record medium is pulled past the scanning member 18*c* in a direction to the right of the axis 30** as shown in FIGURE 1.

It should be noted that the record medium upon which information is to be recorded moves in a direction opposite to the direction of the record medium from which information is being sensed so that when there is a simultaneous reading and the recording of a duplicate copy, a proper relationship is maintained to insure that a true and not reverse copy is obtained.

Suitable commutating means or switching means hereinafter more fully described is provided so that the appropriate recording scanning means **18*a* to 18*d* are sequentially energized to record information on the paper 82**.

Although the facsimile transceiver 10 has been described for handling continuous and movable record mediums, it should be noted that the facsimile transceiver 10 can equally be self-propelled over record media that are fixed on a flat surface. In particular, it is only necessary to remove the scanning section 12 from the record medium handling section 14 and place the scanning section 12 atop the fixed record medium with the power rollers 68 and 88 in contact therewith. However, since the power rollers 68 and 88 rotate in opposite directions, suitable switching is provided (not shown) to deactivate the power roller 88 during a reading operation to permit the power roller 68 to drive the carriage 22 across the record medium from which information is being read, and to deactivate the power roller 68 when a recording operation is being performed so that the power roller 88 pulls the carriage 22 across the record medium upon which information is to be recorded. Therefore, the facsimile transceiver 10 has the added versatility of being able to be used either with stationary fixed copy or with copy of any width.

Since the facsimile transceiver 10, as disclosed, includes four recording scanning means 18*a* to 18*d*, equi-angularly disposed on the rotatable support means 20 about the axis 30, each of the recording scanning means 18*a* to 18*d* sequentially moves across the paper 82. It is, therefore, necessary to provide commutating means or switching means to insure that electrical signals are only fed to the appropriate recording scanning means 18 that is operatively disposed with respect to the paper 82. In particular, each of the recording scanning means 18*a* to 18*d* is provided respectively with recording stylii 94*a* to 94*d* insulatively fixed to the rotatable support means 20. A typical recording stylus 94*c* as shown in FIGURE 1 is provided with a spring means 96*c* to insure constant contact with the paper 82. A wire 98*c* couples the stylus 94*c* to a brush 100*c* insulatively extending through the hollow shaft section 32 of rotatable support means 20.

Brush 100*c* moves over commutator segment support means 49 which is stationarily supported. Embedded in a portion of the surface of commutator segment support means 49 is a commutator segment 48 of a conductive material. The commutator segment 48 extends along an arc which is geometrically related to the arc traced out by any one of the recording stylii 94*a* to 94*d* across the paper 82. A wire 101 fixed to fixed support means 42 is brought out for connection to a signal source (not shown).

Thus, information to be recorded as indicia is fed from a signal source via wire 101 to the commutator segment 48. As each of the stylii 94*a* to 94*d* comes in contact with the paper 82, its associated brush 100*a* to 100*d* makes contact with the commutator segment 48 and the electrical signals are fed to the paper 82. The intensity of the electrical signals determine the darkness of the marks made on the paper 82 by the stylii 94*a* to 94*d*. In this manner, facsimile transceiver 10 records indicia on a record medium.

It should be noted that if the facsimile transceiver 10 is never to be used for fixed copy, the recording apparatus may be considerably simplified. For example, the recording stylii 94*a* to 94*d* may be grounded to the rotatable support means 20 and a section of the platen 84 which is insulated from the remainder of the platen receives the signals for recording. It will be further desirable to insure that the plane of rotation of the recording stylii 94*a* to 94*d* is slightly above the plane of the record medium 81 and that the platen 84 be located in this plane. Thus the recording stylii 94*a* to 94*d* only contact the record medium 82.

Figure 2:
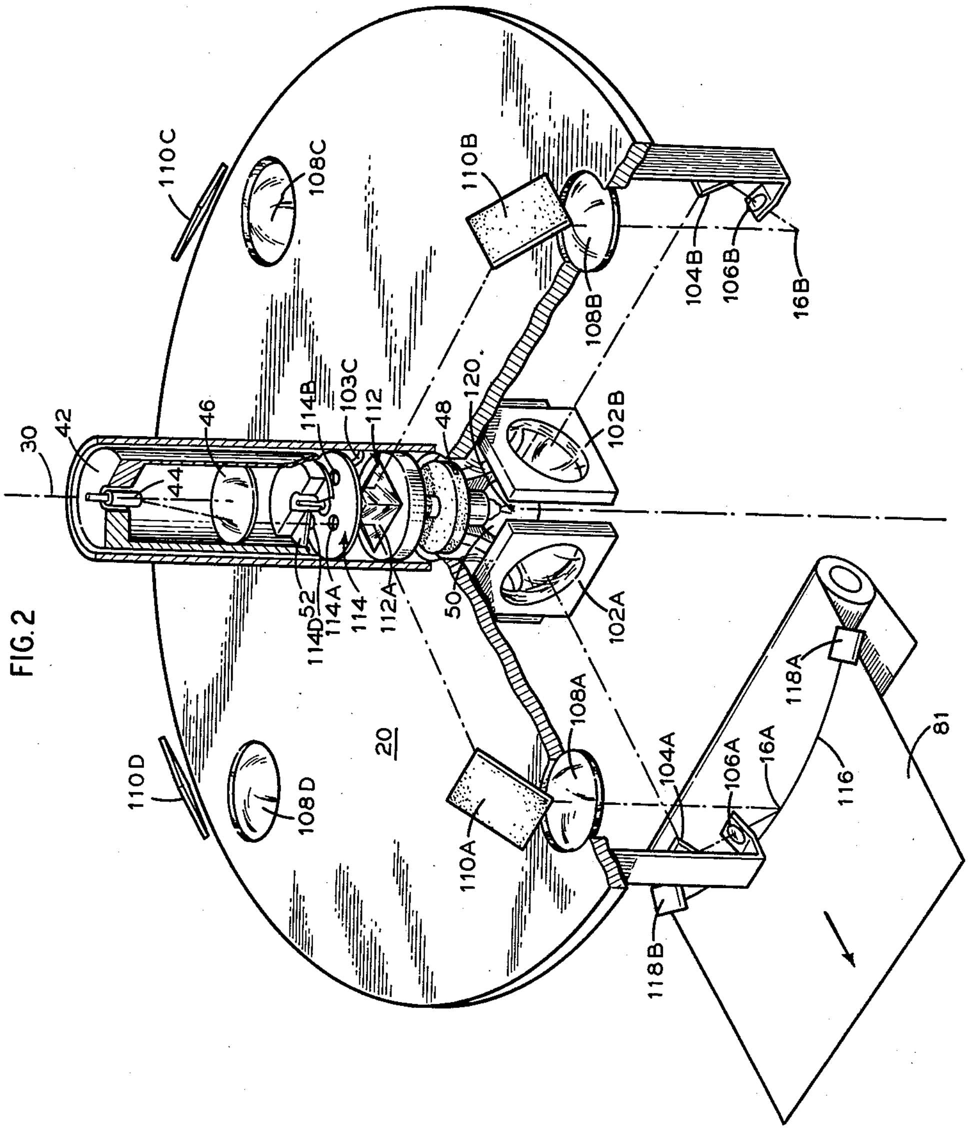
FIGURE 2 is a perspective view, partially broken away, of rotatable optical scanning means employed in the facsimile apparatus of FIGURE 1, shown disposed operatively with respect to a record medium from which indicia is sensed.

To read indicia from a record medium, each of the reading scanning means 16*a* to 16*d* has associated with it an optical system. In FIGURE 2, these optical systems are shown as being equi-angularly disposed about the rotatable support means 20. Since each of the optical systems is identical, only the optical system associated with reading scanning means 16*a* will be completely described.

The optical system comprises a mirror 104*a* radially disposed from the source of light 50, a lens 102*a* interposed between the mirror 104*a* and the source of light 50, a lens 106*a* interposed between the mirror 104*a* and a record medium 81, a lens 108*a* axially disposed from the record medium 81, a mirror 110*a* disposed above the lens 108*a*, an opening 103*a* (seen in FIG. 1) in hollow shaft 32, a face 112*a* of a pyramidal mirror 112 disposed on the axis 30 and an aperture 114*a* in an aperture disc 114 disposed between the pyramidal mirror 112 and the lens 46.

Lens 102*a*, mirror 104*a* and lens 106*a* provide means for guiding light from the source of light 50 to elemental areas of the record medium 81. In particular, lens 102*a* collects light from the source of light 50 and transmits it via mirror 104*a* to lens 106*a* which concentrates the light on a small elemental area. The mirror 104*a* is so oriented that light from lens 102*a* is reflected through lens 106*a*. Lens 108*a*, mirror 110*a*, opening 103*a*, face 112*a* of pyramidal mirror 112 and aperture 114*a* of aperture disc 114 provide means for guiding light from an elemental area of record medium 81 to photo-electric cell 44 via lens 46. In particular, lens 108*a* collects the light reflected or diffused from record medium 81 and transmits it to mirror 110*a* from which it is reflected radially towards the axis 30 through opening 103*a where it is intercepted by face 112***a* and reflected through aperture 114*a* to lens 46 and photo-electric cell 44.

The actual geometrical relationships and the optical path lengths between the various lenses, mirrors, the source of light 50 and the photo-electric cell 44 are hereinafter more fully described. However, in general, light is transmitted from the source of light 50 radially via lens 102*a* to mirror 104*a* and reflected substantially axially through lens 106*a* to record medium 81. Light reflected and diffused from record medium 81 is transmitted substantially axially through lens 108*a* to mirror 110*a* from which it is reflected along a path that is radial towards the axis 30. The face 112*a* of the pyramidal mirror 112, whose apex is centered on the axis 30, intercepts the light and reflects it along a path slightly displaced from and parallel to the axis 30. The light reflected from the face 112*a* passes through the aperture 114*a* to the lens 46.

Since the lens 102*a*, the mirror 104*a*, the lens 106*a*, the lens 108*a*, the mirror 110*a*, the pyramidal mirror 112 and the aperture disc 114 are all mounted on the rotatable support means 20, there is provided a rotatable optical system. This system rotates about the axis 30, causing the illumination of elemental areas on record medium 81 along an arcuate path 116. The record medium 81 is substantially planar with its center line colinear with a radius drawn from the axis 30. Since the record medium 81 is moved in a direction parallel to its center line and therefore perpendicular to the axis 30, a series of arcuate scans that are substantially parallel to each other are performed while the rotatable support member 20 is rotating and the record medium 81 is moving. In this way, reading scanning means 16*a* scans the record medium 81 so that fixed images anywhere on the record medium 81 are capable of being sensed. More particularly, the quality of the elemental areas, for example, their degree of darkness, determines the quantity of light reflected or diffused therefrom. This light is transmitted via the lens 108*a*, the mirror 110*a*, the opening 103*a*, the face 112*a*, the aperture 114*a* to the lens 46 and to the photo-electric cell 44 to determine the intensity of the electrical signal transmitted from the photocell 44 to a signal amplifier (not shown). Thus, if the elemental area is completely white, the photo-electric cell 44 transmits an electrical signal of one amplitude, whereas if the elemental area is completely black, the photo-electric cell 44 transmits an electrical signal of another amplitude.

In order to insure that the lens 46 and the photo-electric cell 44 receive only light from the scanning means 16 which is moving over the record medium 81, a light gating means or switching means is provided. The light gating means comprises a major light gate 52 and a minor light gate 118. The major light gate 52 is basically an opaque disc mounted in fixed support means 42 between the aperture disc 114 and the lens 46. A sector of the disc is removed. The removed sector is azimuthly oriented with respect to the record medium 81 and subtends an angle related to the angle subtended by an arcuate scan 116. Generally, only light passing through one of the apertures 114*a* to 114*d* can reach lens 46. More particularly, however, the angle subtended by the sector in the major light gate is equal to 360° divided by the number of optical systems, plus the angle subtended by one of the apertures 114*a* to 114*d* in the aperture disc 114 in degrees. Such a sector insures that only one of the apertures 114*a* to 114*d* transmits light to the lens 46 except for a slight time at the beginning and end of an arcuate scan when portions of two successive apertures are exposed.

To remove this ambiguity and to precisely fix the beginning and end of an arcuate scan by each one of the reading scanning means 16a to 16d, the minor light gate 118 is employed. The minor light gate 118 comprises a pair of mirrors 118A and 118B. The mirrors 118A and 118B are positioned at opposite sides of the record medium 81 with their planes of reflection substantially parallel to the record medium 81. The closest edges of the mirrors 118A and 118B are separated by an arc which subtends an angle of 360° divided by the number of optical systems employed. In this embodiment since there are four optical systems, the length of the arc will be 90°. Thus when two of the apertures, say 114a and 114b are exposed, only one of the lenses, say 106a, is concentrating light on the record medium 81, while the other lens 106b will be concentrating light on the mirror 118A. Since the mirror 118A can be considered a perfect reflector, none of the light received by the mirror 118A from the lens 106b will be reflected through lens 108b, hence there will be no light transmission via the aperture 114b. On the other hand, since the record medium 81 is not a perfect reflector, there will be a diffusion of light about the elemental area and this diffused light is transmitted through the lens 108a via mirror 110a and face 112a to aperture 114a. In this way, it is assured that light from only one of the reading scanning means 16a to 16d reaches the photo-electric cell 44 and also that there is a very sharp transition between the beginning and the termination of each of the arcuate scans 116. It should be noted that the mirrors 118A and 118B can be replaced with light absorbing elements.

Since the light source 50 is stationary, it is viewed during rotation by the optical systems at different angles. Consequently, it would be desirable for the light source 50 to be an ideal point source. In practice, however, point sources cannot be obtained. Therefore, the image of the light source 50 concentrated on different elemental areas, will vary and there will be changes in the intensity of the light reflected from the elemental areas of the record medium 81 even when these elemental areas have the same degree of reflectance and diffusion.

Accordingly, to prevent such variations in intensity, the light source 50 is provided with a linear filament 120 that is oriented parallel to a transverse axis of the record medium 81. Under ordinary circumstances the image of the filament 120 when viewed from an edge of the record medium 81 will be foreshortened with respect to the image of the filament 120 when viewed from the center of the record medium 81 for the radiation pattern of filament 120 is, in general, non-linear. However, the diameter of the lens 106a is chosen to compensate for this reduction. In particular, the diameter of the lens 106a is chosen to be substantially equal to the foreshortened image of the filament 120. Furthermore, as is hereinafter more fully described, the optical path length from the lens 102a to the lens 106a is chosen to be slightly greater than the image distance of the lens 102a. Therefore, as the image of the filament 120 projected by the lens 102a on the mirror 104a increases in size, it exceeds the diameter of the lens 106a and those portions over-extending the edges of the lens 106a are not transmitted therethrough to the elemental areas of the record medium 81. Hence, an image of constant intensity is always concentrated on the elemental areas of the record medium 81 and there is no possibility of variations in intensity due to different azimuth positions of the reading scanning means 16a along the arcuate scan line 116.

Figures 3, 4:
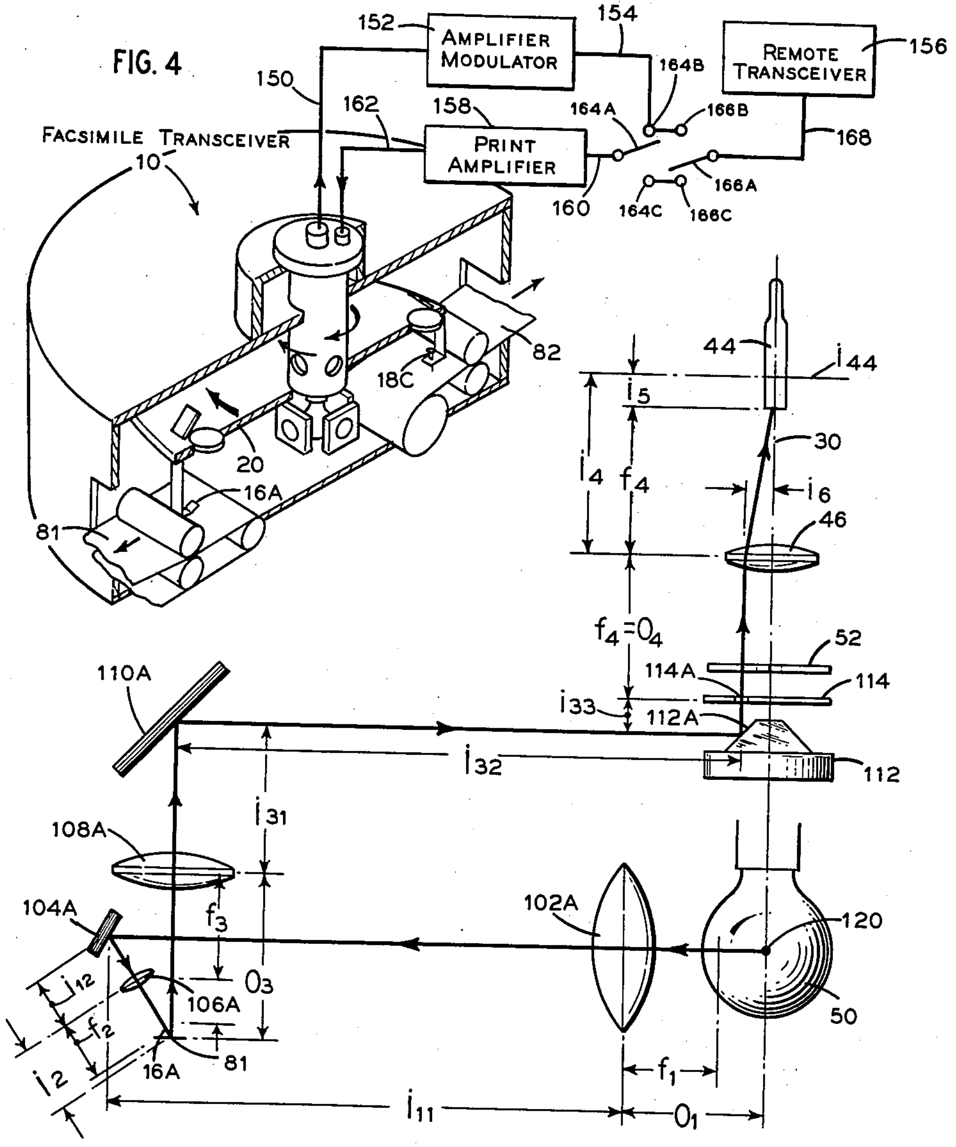
FIGURE 3 shows schematically a typical optical system of the apparatus of FIGURES 1 and 2.
FIGURE 4 is a schematic diagram of a system incorporating the facsimile apparatus of FIGURE 1.

A typical optical system and one associated with reading scanning means 16a, as shown in FIGURE 3, will now be described.

The lens 102a is positioned from the filament 120 of the source of light 50 by an object distance $O_1$ which is slightly greater than the focal length $f_1$ of the lens

102a, and the filament 120 is located on the optical axis of the lens 102a. The mirror 104a is disposed on the image side of the lens 102a and tilted with respect to the optical axis of the lens 102a to transmit light toward the record medium 81. The lens 106a is disposed between the mirror 104a and the record medium 81. The optical axis of the lens 106a is colinear with the reflected optical axis of the lens 102a. The optical path length $i_{11}$ between the lens 102a and the mirror 104a is equal to the image distance of the lens 102a. The optical path length $i_2$ between the lens 106a and the elemental area of the record medium 81 is slightly greater than the focal length $f_2$ of the lens 106a so that an image of lens 102a is projected by lens 106a onto the record medium 81.

The lens 102a, because of its size and position with respect to the source of light 50, collects light from a very large solid angle and concentrates this light on the lens 106a by reflection from mirror 104a. The lens 106a, because of its position with respect to the lens 102a and its nearness to the record medium 81, concentrates the light uniformly over a very small area. Thus, a highly efficient and simple illuminating system is provided.

The lens 108a is positioned from the record medium 81 by an object distance $O_3$ which is slightly greater than its focal length $f_3$. The optical axis of the lens 108a passes through the elemental area of light being illuminated and is perpendicular to the record medium 81. The mirror 110a is located on the image side of the lens 108a and is tilted to reflect light from the lens 108a toward the pyramidal mirror 112. The face 112a of the pyramidal mirror 112 is substantially parallel to the mirror 110a and reflects light therefrom toward the aperture disc 114. The optical path length $i_{31}$ between the lens 108a and the mirror 110a plus the optical path length $i_{32}$ between the mirror 110a and the face 112a of pyramidal mirror 112 plus the optical path length $i_{33}$ between the face 112a and the aperture disc 114, is equal to the image distance of the lens 108a. It should be noted that the optical path length $O_4$, located in between aperture disc 114 and the lens 46, is equal to the focal length $f_4$ of the lens 46. The image distance $i_{31}$ between the lens 108a and the mirror 110a plus the image distaance $i_{32}$ between the mirror 110a and the face 112a plus the image distance $i_{33}$ between the face 112a and the aperture 114a plus the object distance $O_4$ between the aperture 114a and the lens 46 become collectively the object distance between the lens 108a and the lens 46. The image distance $i_4$ between the lens 46 point $i_{44}$ locates the plane upon which lens 46 projects an image of lens 108a. The image of lens 108a is uniformly illuminated over its entire area and slightly displaced to the right of axis 30 by an amount proportional to the ratio of $i_5$ to $i_4$ and the distance $i_6$. The photo-electric cell 44 is positioned vertically so that its photo-sensitive surface inercepts the light forming the image of lens 108a at the point where it crosses the axis 30.

The lens 108a, because of its size and proximity to the record medium 81, collects a large solid angle of the light diffused from the record medium 81 and transmits it to the aperture disc 114 disposed in its image plane. The aperture disc 114 is also disposed on the object side of the lens 46 and the light passing through the aperture 114a is directed at the focal point of the lens 46. Since the photo-electric cell 44 is disposed at the point where light crosses axis 30, there is no variation of the intensity of the light received due to the azimuth position of the scanning means 16a provided it its scanning regions of constant quality of the record medium 81. Thus, the variation in intensity of the light received by the photo-electric cell 44 will only be dependent upon the images being sensed on the record medium 81 and not from any geometrical position of the scanning member 16a. Hence the photo-electric cell 44 can be stationarily mounted and there is no need for any electrical signal commutators which are normally required with rotating photosensitive devices.

It should be noted that the light source 50, the pyramidal mirror 112, the lens 46 and the photo-elecric cell 44 are common to all optical systems.

In FIGURE 4 a facsimile transceiver 10 is shown incorporated in a communications system. Record medium 81 is scanned by reading scanning means 16a and the light from its elemental areas is converted to electrical signals as heretofore described. The electrical signals are fed via a line 150 to an amplifier modulator 152 which transmits a carrier signal that is amplitude modulated in accordance with the image on record medium 81. The modulated carrier signal is received via lines 154 and 168 by a remote facsimile transceiver 156 which includes a transceiver identical to facsimile transceiver 10.

On the other hand, when facsimile transceiver 10 is to record information transmitted from remote transceiver 156, carrier signals, amplitude modulated with the information, are received by an amplifier from a line 160. The signal is fed via line 162 to facsimile transceiver 10 where it is transmitted to recording scanning means 18c as heretofore disclosed. The electrical signals on the stylus of recording scanning means 18c cause the marking of the record medium 82.

Since the reading scanning means 16a and the recording scanning means 18c are disposed on a rotary support means 20, arcuate scans of the record media 81 and 82 are performed.

Not only may the facsimile transceiver 10 be employed to receive and transmit information, but it may also perform copying operations.

A switch 164 has a moving contact 164a coupled to line 160 and first and second fixed contacts 164b and 164c with contact 164b connected to the line 154. A second switch 166 has a moving contact 166a coupled to line 168 and first and second fixed contacts 166b and 166c with fixed contact 166b coupled to line 154 via fixed contact 164b of switch 164. Fixed contact 166c of switch 166 is coupled to fixed contact 164c of switch 164.

When moving contact 164a is coupled to the fixed contact 164b the modulated carrier signals received by amplifier 158 are from amplifier modulator 152. When moving contact 166a is coupled to fixed contact 166b the modulated carrier signals from amplifier modulator 152 are transmitted to remote transceiver 156 via line 168 regardless of position of moving contact 164a.

On the other hand, when moving contact 166a is coupled to fixed contact 166c, and moving contact 164a is coupled to fixed contact 164c the modulated carrier signals received by amplifier 158 are from the remote transceiver 156 via lines 168 and 160.

A similar pair of switches in remote transceiver 156 are positioned oppositely to switch 166.

There has thus been shown an improved facsimile transceiver which is capable of operating with continuous record media of indefinite length and width.

There has further been shown a facsimile transceiver which by employing a rotatable support means for carrying a reading scanning means and a recording scanning means provides an inexpensive and very simple scanning mechanism which is highly reliable and easily serviceable.

There has also been shown improved reading scanning means of the optical type which provide for uniform distributions of light and have a maximum of signal to noise ratio. The optical scanning means are extremely efficient and permit the use of stationary light sources and stationary light responsive devices, thus dispensing with the need for complicated and unreliable electrical signal commutating means for the particularly low level signals transmitted by photo-electric transducers.

In addition, a highly versatile facsimile transceiver has been disclosed which may be used for either sheets of record media or for large expanses of record media which cannot be removed from a fixed surface or cut into narrow machine width strips, i.e., large maps.

There has still further been shown facsimile apparatus which employs multiple scanning means and which has very simple and reliable means for controlling which of the scanning means is to be employed.

There will now be obvious to those skilled in the art many modifications and variations accomplishing many or all of the objects of the invention and realizing many or all of its advantages, but which, however, do not essentially depart from the spirit of the invention as defined in the following claims.

What is claimed is:

1. In apparatus for transferring information between record media, the combination of a first scanning member for sensing indicia on a record medium for producing facsimile marking signals for transmission, a second scanning member responsive to facsimile marking signals for recording indicia on a recording medium, rotatable support means for supporting said first and second scanning members, means for rotating said support means in a first plane, said first and second scanning members on said support means being positioned on the same side of said first plane, means for moving the record medium having indicia to be sensed by said first scanning member in a second plane for flat-bed scanning, means for moving the recording medium upon which indicia is to be recorded in a third plane for flat-bed scanning, said first, second and third planes being substantially parallel, and control means selectively operative to effect scanning operations by said first and second scanning members either concurrently or at different times, respectively.

2. The combination of claim 1 wherein the said second and third planes are substantially co-planar.

3. In apparatus for transferring information between record media, the combination of a first scanning means for optically sensing indicia on a record medium for producing facsimile marking signals for transmission, a second scanning means responsive to facsimile marking signals for recording indicia on a recording medium, a rotatable support means for supporting said first and second scanning means, means for rotating said rotatable support means in a first plane, said first and second scanning means being positioned on said rotatable support means on the same side of said first plane, means for moving said record media planarly for flat-bed scanning, the plane of movement of each of said record media being parallel to said first plane, and control means selectively operative to effect scanning operations by said first and second scanning means either concurrently or at different times, respectively.

4. In apparatus for transferring information between record media, the combination of a first scanning means for optically sensing indicia from a first record medium for producing facsimile marking signals for transmission, a second scanning means responsive to facsimile marking signals and including an electrical stylus for recording indicia on an electrosensitive recording medium, a rotatable support means, means for positioning said first and second scanning means diametrically on said rotatable support means, means for rotating said rotatable support means in a first plane, said first and second scanning means support means, means for rotating said rotatable support being disposed on the same side of said first plane, means for moving said record media planarly for flat-bed scanning, the plane of movement of each of said record media being parallel to said first plane, and control means selectively operative to effect scanning operations by said first and second scanning means either concurrently or at different times, respectively.

5. In apparatus for transferring information between record media, the combination of first and second scanning means for sensing indicia from a first record medium for producing facsimile marking signals for transmission, third and fourth scanning means responsive to facsimile marking signals for recording indicia on a second record medium, a rotatable support means, means for disposing said first and third scanning means at a first position on said rotatable support means, means for disposing said second and fourth scanning means at a second position of said rotatable support means, said first and second positions being diametrically related, means for rotating said rotatable support means in a first plane, said first, second, third and fourth scanning means being disposed on the same side of said first plane, first switching means for activating the one of said first and second scanning means operatively positioned with respect to said first record medium, second switching means for activating the one of said third and fourth scanning means operatively positioned with respect to said second record medium, means for moving said record media planarly for flat-bed scanning, the plane of movement of each of said record media being parallel to said first plane, said first and second switching means being selectively operative to effect transmitting and recording operations either concurrently or at different times, respectively.

6. The combination of claim 5 wherein said first and second scanning means optically sense indicia.

7. A facsimile transceiver comprising a housing having a lower section thereof enclosing line feed mechanisms respectively for advancing a record medium having indicia thereon to be transmitted as facsimile marking signals and for advancing an electrosensitive recording medium responsive to facsimile marking signals, said housing having an upper section thereof enclosing flat-bed scanning apparatus including a scanning frame member rotatable about a vertical axis and carrying diametrically positioned optical scanning devices successively operative to cause a light beam to scan indicia on said record medium and diamtrically positioned electrical stylii successively operative to apply received facsimile marking signals to said recording medium, a stationary shaft mounted in and depending from the upper portion of said upper housing and concentric with said vertical axis, said rotatable frame member having an upwardly extending shaft rotatably supported by said stationary shaft, motor-driven means for rotating the scanning frame member, said optical scanning devices and electrical stylii depending from the rotatable frame member and arranged to effect their scanning operations in substantially the same horizontal plane.

8. A facsimile transceiver comprising a housing having a lower section thereof enclosing line feed mechanisms respectively for advancing a record medium having indicia thereon to be transmitted as facsimile marking signals and for advancing an electrosensitive recording medium responsive to facsimile marking signals, said housing having an upper section thereof enclosing flat-bed scanning apparatus including a scanning frame member rotatable about a vertical axis and carrying diametrically positioned optical scanning devices successively operative to cause a light beam to scan indicia on said record medium and diametrically positioned electrical stylii successively operative to apply received facsimile marking signals to said recording medium, a stationary hollow shaft mounted in and depending from the upper portion of said upper housing section and concentric with said vertical axis of rotation, means including said optical scanning devices for producing a scanning light beam, a light sensitive element mounted within said stationary hollow shaft and responsive to said scanning light beam for generating facsimile marking signals representing the scanned indicia, said rotatable frame member having an upwardly extending hollow shaft rotatably supported by said stationary hollow shaft, motor-driven means for rotating said scanning frame, means for directing the scanning light beam through said stationary hollow shaft and onto the light sensitive element, and means comprising a commutator element and a conductor within the stationary hollow shaft for connecting the electrical stylii to an incoming recording circuit.

9. A facsimile transceiver comprising a housing having a record handling section enclosing line feed mechanisms respectively for advancing a record medium having indicia thereon to be transmitted and for advancing a recording medium for receiving facsimile indicia signals, said housing including a carriage superposed on said record handling section and detachably secured thereto, said carriage comprising a self-contained unit supporting and enclosing flat-bed scanning apparatus including a first rotatable scanning member for sensing indicia on said record medium for producing facsimile indicia signals to be transmitted and a second rotatable scanning member for recording received facsimile indicia signals on said recording medium, said carriage being detachable from said record handling section and operable as a separate unit to scan either a record medium or a recording medium while remaining in flat condition, said carriage having motor-driven line feed rollers for advancing the carriage relative to the flat record medium or recording medium during scanning operations.

10. Apparatus in accordance with claim 9, in which said motor-driven line feed rollers are arranged to engage and drive the line feed mechanisms in said record handling section of the housing when the carriage is superposed thereon.

11. Apparatus in accordance with claim 9, in which the line feed mechanism in said record handling section for advancing a record medium comprises a belt for supporting and advancing the record medium past the scanning path, and the means for driving the belt comprises certain of the motor-driven feed rollers on said carriage when it is superposed on the record handling section.

12. Apparatus in accordance with claim 11, in which said belt is perforated, the belt passing around a suction box and adjacent to a loading tray, whereby a record medium fed into the loading tray is held by suction against the belt and kept flat in the area in which it passes the scanning path.

13. Apparatus in accordance with claim 9, in which the line feed mechanism in said record handling section for a recording medium comprises feed rollers for advancing the medium past the scanning path, said feed rollers being driven by certain of said motor-driven line feed rollers of the carriage when it is superposed on the record handling section.

References Cited in the file of this patent

UNITED STATES PATENTS

| | | |
|---|---|---|
| 728,254 | Liebreich et al. | May 19, 1903 |
| 1,800,000 | Zworykin | Apr. 7, 1931 |
| 2,092,765 | Losier | Sept. 14, 1937 |
| 2,394,649 | Young | Feb. 12, 1946 |
| 2,396,286 | Ridings | Mar. 12, 1946 |
| 2,447,473 | Finch | Aug. 17, 1948 |
| 2,750,443 | Nyman | June 12, 1956 |
| 2,769,856 | Artzt | Nov. 6, 1956 |
| 2,776,336 | Clauer | Jan. 1, 1957 |